March 26, 1974  E. JONES  3,799,821

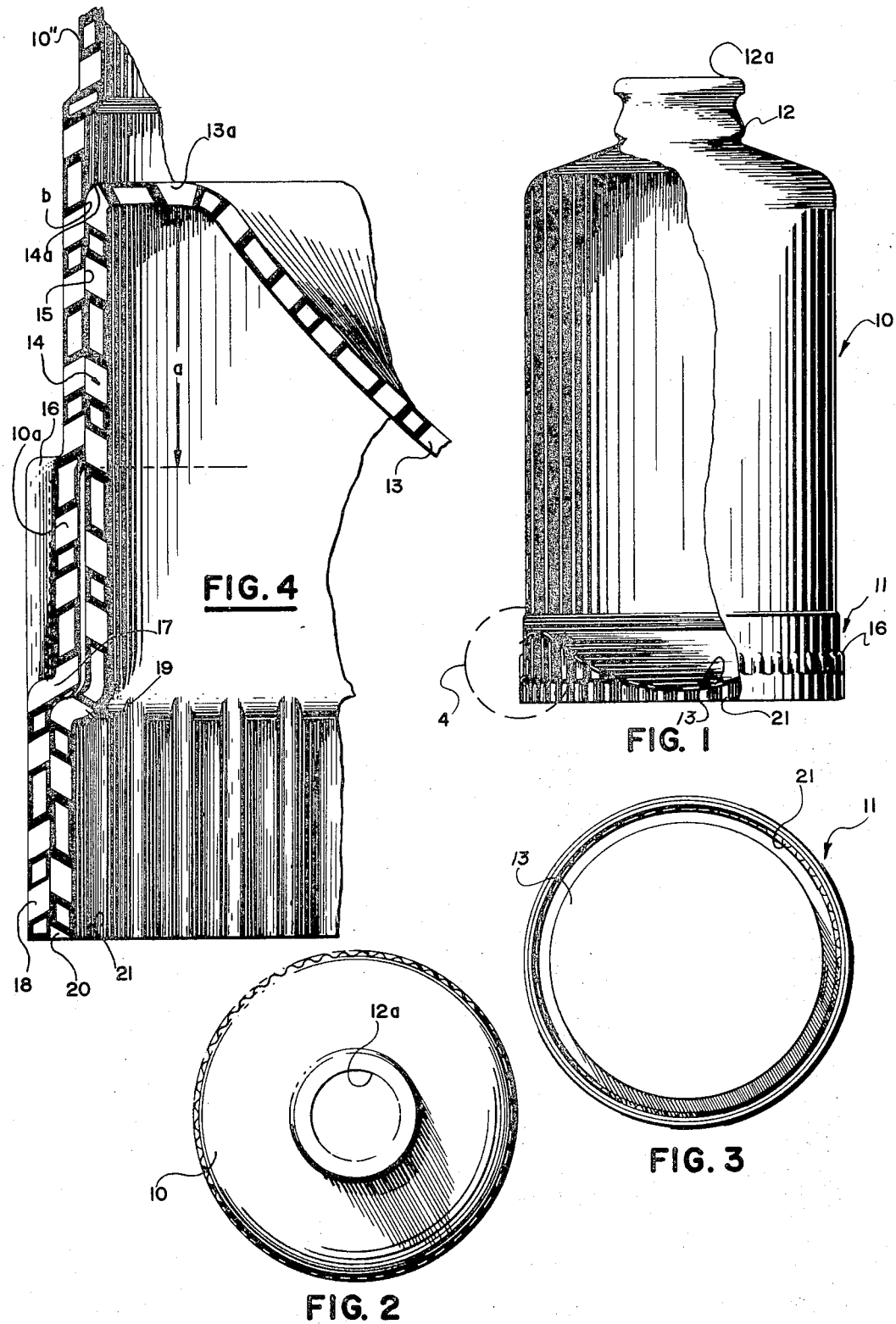

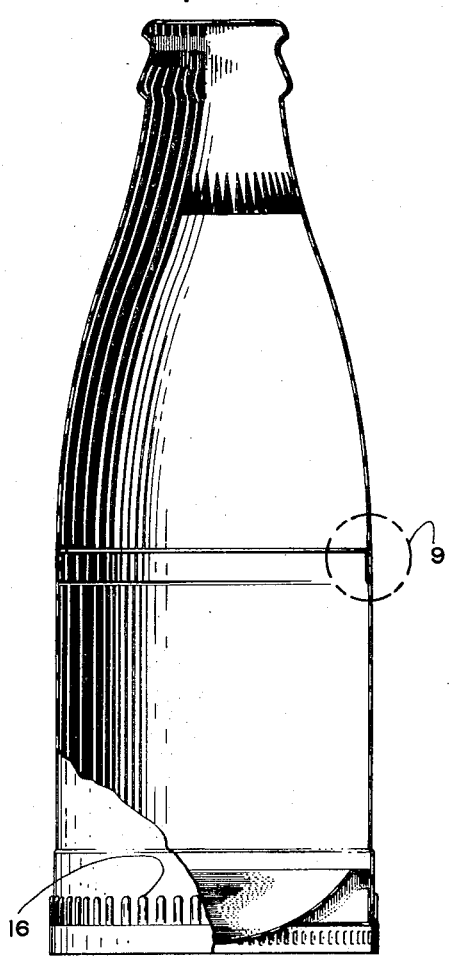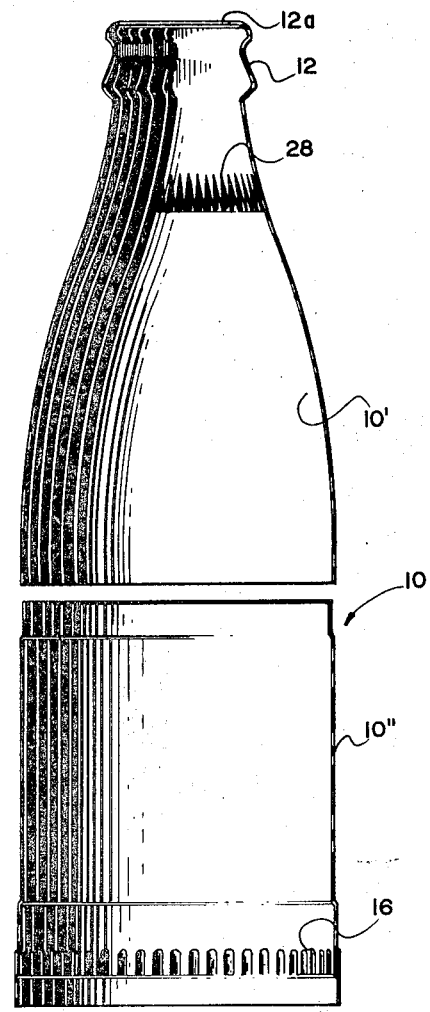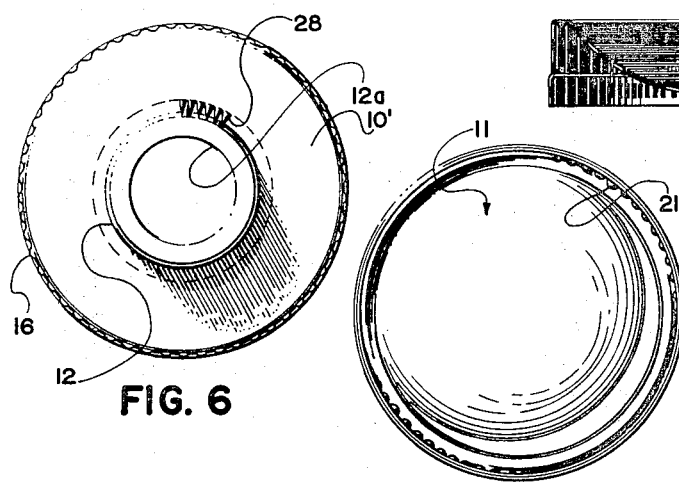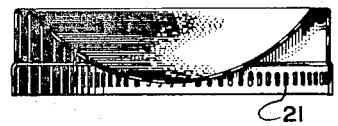

METHOD FOR MAKING THIN WALLED THERMOPLASTIC PRESSURE VESSELS

Original Filed Oct. 12, 1970  3 Sheets-Sheet 3

United States Patent Office 3,799,821
Patented Mar. 26, 1974

3,799,821
METHOD FOR MAKING THIN WALLED THERMO-PLASTIC PRESSURE VESSELS
Elwyn Jones, 3318 N. Branch Road,
Beaverton, Mich. 48612
Original application Oct. 12, 1970, Ser. No. 79,910, now Patent No. 3,712,497. Divided and this application July 14, 1972, Ser. No. 272,013
Int. Cl. B29c 27/08
U.S. Cl. 156—73            3 Claims

ABSTRACT OF THE DISCLOSURE

A bottle, particularly for carbonated beverages such as conventional soft drinks and beer, and formed of thin walled, flexible, synthetic plastic parts which are differential pressure formed in heated thermoplastic webs and then severed therefrom, and comprising generally: an upper side wall portion having a neck from which the beverage or the like may be poured, and a generally convex bottom wall for the bottle or vessel having a continuous peripheral flange telescopically received within the lower end of the side wall portion. The external diameter of the upper portion of the flange is slightly greater than the interior diameter of the section of the side wall portion in which it is received so as to be received therein with an interference fit, the parts being friction welded together to dispose friction weld material between the upper portion of the flange and the side wall at the periphery of the convex bottom wall to securely bond the parts together. Another embodiment of the invention is disclosed in which the side wall portion is formed of telescopically interfitted and friction welded upper and lower sections.

---

This is a division of application Ser. No. 79,910, filed in the U.S. Patent Office on Oct. 12, 1970, now U.S. Pat. No. 3,712,497.

BACKGROUND OF THE INVENTION

The invention relates broadly to disposable plastic bottles, which can be formed economically at high rates of production, for storing beverages and the like under pressure, and more particularly to a novel vessel or bottle which can withstand considerable internal pressure without bulging or rupturing. Presently, synthetic plastic bottles, which are manufactured by conventional blow molding methods and have relatively thick and rigid walls to withstand internal pressures which may be generated during the handling of the carbonated beverages contained therein, are being trial marketed. It is estimated conservatively that such beer containers must be capable of withstanding internal pressures up to 50 p.s.i. and such bottles for beverages such as Pepsi-Cola and Coca-Cola soft drinks must be capable of withstanding pressures up to 75 p.s.i. While these blow molded, thick walled containers are preferable to containers made of other material, because they are light in weight and will not shatter or dent when dropped, still the ultimate in lightness and economy has not been obtained with plastic bottles of one piece, blow molded construction.

SUMMARY OF THE INVENTION

An object of the present invention is to remedy the shortcomings of the prior art vessels mentioned. In particular, it is an object of the invention to design a vessel or bottles which can be much more economically manufactured by forming parts in a plurality of relatively thin walled plastic webs with conventional differential pressure thermoforming machinery and then separating them from the webs and assembling them. More specifically the invention is concerned with a bottle, and method of forming the bottle, wherein the bottle is formed in separate parts which are so designed that they can be later united with available friction welding equipment. A bottle or container which is formed according to the specifications of the present invention will be much lighter in weight and will contain less plastic material, and has been found to be capable of withstanding much greater internal pressures than the maximum it would be required to take, considering the beverages which are to be handled. Briefly, the container includes an upper side wall portion including a neck configured to receive a cap. The side wall portion may be formed of one section, or several telescopically received annular sections which are friction welded in assembled relation, and a convex bottom wall part is provided having a reversely turned flange which interfits within the lower end of the side wall portion and is of a diameter such that it may be friction welded in position. The bottle or vessel is particularly designed to facilitate telescoping of the sections to be friction welded for relative axial positioning of the parts to be friction welded, for avoiding the introduction of plastic fines into the interior of the vessel, and for gripping the various parts of the vessel to permit the friction welding assembly operations to be performed. It is the upper portion only of the bottom section flange which is friction welded in position so that gases generated in handling do not tend to separate the parts, and the friction welding of the lower portion of the flange is avoided so that an inertia type friction weld can be achieved.

BRIEF DESCRIPTION OF THE DRAWINGS

Other objects and advantages of the invention will become apparent from a consideration of the following detailed description of representative embodiments of the invention taken in conjunction with the accompanying figures in the drawings in which:

FIG. 1 is a partly sectional, side elevational view of a bottle or vessel designed particularly to hold a carbonated beverage such as beer;

FIG. 2 is a top plan view thereof;

FIG. 3 is an inverse plan view thereof;

FIG. 4 is a greatly enlarged, fragmentary, sectional, side elevational view taken of the circled area in FIG. 1;

FIG. 5 is a partly sectional, side elevational view of a second embodiment of the invention in which a three piece bottle for accommodating soft drinks is shown;

FIG. 6 is a top plan view thereof;

FIG. 7 is a inverse plan view thereof;

FIG. 8 is an exploded view showing the three parts of the vessel in separated position;

DESCRIPTION OF THE PREFERRED EMBODIMENT

Figure 10:
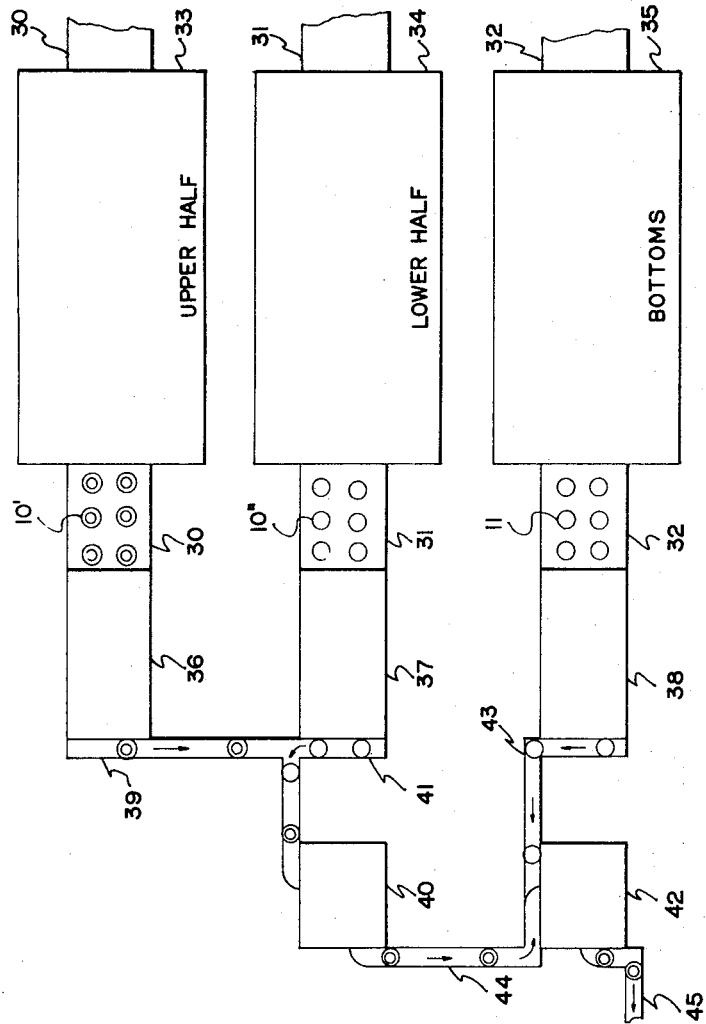
FIG. 10 is a schematic diagram illustrating a system for forming and assembling the vessels.

Referring now more particularly to the accompanying drawings, and in the first instance to FIGS. 1–4, the particular beer container formed is shown in assembled condition as comprising an upper side portion, generally designated 10, and a generally convex bottom section, generally designated 11, which is telescopically received within the lower end of the side wall portion 10 and securely bonded thereto in a manner which will be presently described. The upper end of the side wall portion 10 is formed with a neck section 12 which may be threaded as shown to receive a conventional cap (not shown), it being understood that an opening 12a is punched in the upper end or top wall of the neck 12 to facilitate pouring of the beverage from the container once the cap (not shown) has been removed.

FIG. 4 particularly illustrates the configuration of a bottom section 11 and the manner in which it interfits with the lower end of the side wall section 10. Each bottom wall section 11 includes a generally convex bottom wall portion 13, merged with a generally horizontal flat rim portion 13a which in turn merges with a reversely turned flange portion generally designated 14. As will be indicated later, the side wall parts 10 and bottom wall parts 11 are differential pressure formed in relatively thin, thermoplastic material, such as, for instance, clear, transparent polyvinylchloride material. Typically, the wall thickness of the parts will range between .018 inch to .030 inch in mean wall thickness, when formed.

As FIG. 4 indicates, the upper end of annular flange 14 is provided with a curvilinear merging surface 14a which functions as a pilot to facilitate entry of the bottom wall section 11 into the lower end of the side wall portion 10, and it is to be understood that the upper peripheral portion a of the flange 14 is of greater external diameter than the internal diameter of the side wall portion 10 over its extent so as to be received within this portion of the side wall portion 10 with an interference fit. Friction weld material 15 is disposed between the upper portion of flange 14 and the portion of the side wall 10 which it engages over the distance A and securely bonds the bottom wall section 11 around its entire peripheral flange 14 to the side wall portion 10. Both the side wall 10 and the flange 14 are slightly frustoconical in the sense that they slope outwardly at the same angle in a downward direction, as FIG. 4 indicates. Typically the external diameter of flange 14 at the juncture b of bottom 11 and side wall 10 may be 2.608 inches in diameter when the internal diameter of the wall of section 10 at this point is 2.584 inches and the external diameter of the section a of flange 14 is throughout its length typically .012 inch in diameter greater than the internal diameter of the section of side wall portion 10 with which it interfits. Stating it differently, the diameters are selected so that there is a .012 inch interference fit.

Below the section a the wall 10 has an outset portion 10a which, for instance, may have an internal diameter of 2,624 inches, and which is formed with a series of outwardly projecting vertical ribs 16. Below the ribs 16, a radially out-turned shoulder 17 is provided on the lower portion of side wall section 10 leading to a bottom lip portion 18 which is flush with the outer surface of the ribs 16, as will be apparent from FIG. 4. The flange 14 is similarly provided with a radially out-turned shoulder 19 leading to a terminal end portion 20 which has inwardly projecting vertically extending ribs 21 formed therein. There is no interference fit between the sections 18 and 20 which can be of the same external and internal diameter, respectively.

Each of the side wall sections 10 and bottom sections 11 can be formed with available thermoforming machinery, such as that described in the present assignee's U.S. Pat. No. 3,346,923 and friction welded in assembled relation with apparatus of the character shown in the present assignee's U.S. Pat. 3,297,504. In the latter patent, punch-out or trim press mechanism is disclosed for severing the container-shaped sections from the plastic web in which they are differential pressure formed and, in the instance of each of parts 10 and 11, it is to be understood that such punch-out mechanisms sever the container shaped parts from the web in which they are formed at their open ends. In the case of parts 10 the punch-out mechanism incorporates an additional punch for punching out the openings 12a in the end walls of the neck sections 12. When the parts 10 and 11 are mounted in the part holding sleeves shown in U.S. Pat. 3,297,504 and moved into telescoped relationship to be friction welded together, the stop surfaces 17 and 19 limit the inward telescoping of the parts 10 and 11. Then, when the parts 10 and 11 are relatively rotated in the manner described in the patent to friction weld them together, any fines which result from rubbing of the axially opposed surfaces 17 and 19 have no access to the interior of the vessel or bottle formed. It is thus, important that any axial surfaces which might rub together be disposed at a spaced distance from the juncture b of the bottom wall part 11 and side wall part 10. For the reason that a friction weld exists over the length a, commercing at the juncture b, around the entire periphery of the parts, no gas under pressure can work between the parts 10 and flange 14 to tend to separate them. By limiting the friction weld area to the area a, an inertia weld of the character described in U.S. Pat. 3,297,504 can be achieved which would not be possible, if the entire flange area 14 were in a state of interence fit with the side wall part 10.

In FIGS. 5 thru 8 an alternative form of the invention is illustrated in which the bottom wall section, which I shall also designate 11, is formed in exactly the same manner as described. The side wall section, generally designated 10, is, however, formed of an upper section that the lower section 10'' is formed at its lower end to interfit with bottom sections 11 in exactly the manner previously described and the same numerals are used to designate the like parts. As will be noted, it is the upper portion 10' which is formed with the neck 12 for receiving a cap (not shown), and has an opening 12a punched therein.

Figure 9:
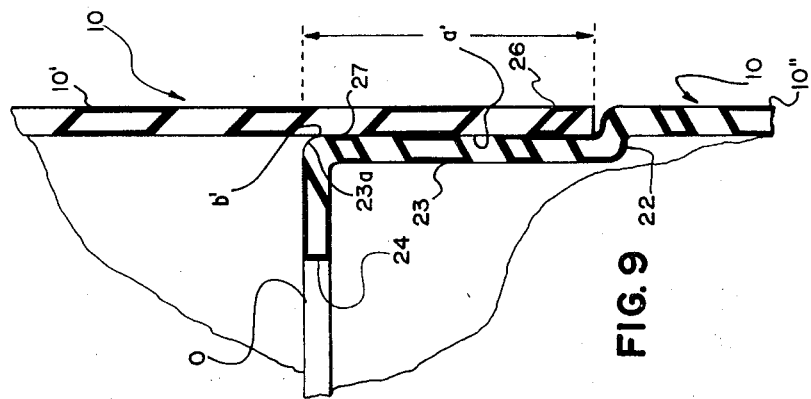
FIG. 9 is a greatly enlarged, fragmentary, side elevational, sectional view of the area of the bottle encircled in FIG. 5.

FIG. 9 particularly illustrates the manner in which the parts 10' and 10'' are joined together in friction welded condition. As FIG. 9 indicates, the upper end portion of the part 10'' is formed with a radially inset shoulder 22 which merges with an inset upper end portion 23 terminating in a radially inturned lip 24. The upper side part 10' has a terminal portion 26 which receives portion 23 and extends flush with the portion of part 10'' below shoulder 22, as shown in FIG. 9. Portions 23 and 26 may be vertical as shown or may also be slightly frustoconical and slope outwardly in a downward direction at a common angle. The rigidity of the vessel is greatly enhanced by providing double wall thickness axially at the locations of wall portions 23 and 26 and the appearance is attractive because of the flush fit' The portion 23 is an interference fit within the portion 26, an an interference fit of .012 inch may also be used in this instance. Typically, the external diameter of section 23 may be 2.34 inches at juncture b' for example, when the part 10' in which it engages has an internal diameter of 2.302 inches. This .012 interference differential is maintained over the length a' of the friction weld which is achieved, there being friction weld material 27 disposed between these surfaces over the length a', as indicated. The wall 23 is provided with an upper curvilinear surface 23a, as shown, functioning as a pilot surface to facilitate entry of the part 10'' into the part 10'. Because no axially engaging parts are employed on the internal surfaces of the parts, no fines are generated during friction welding which could contaminate the contents of the bottle when it is filled. Ribs 28 provide in each section 10' permit gripping of sections 10' to facilitate friction welding. When assembled in the manner indicated, the bottle formed may have a weight of about 30 grams, which is considerably lighter than are present plastic containers for carbonated beverages.

FIG. 10 is a schematic diagram illustrating a method of making and assembling the container parts for the vessel shown in FIGS. 5–9. Three separate plastic webs 30, 31 and 32 are shown being supplied to three thermoformers 33, 34 and 35, respectively, which operate in the manner indicated in U.S. Pat. 3,346,923 to respectively form upper sections 10' intermediate sections 10'', and bottom sections 11 in the sheets 30–32 respectively. It is to be understood that the sheets 30 and 32 may be supplied by an extruder or may be supplied from rolls of plastic sheet or web material, mounted adjacent to the thermoforming machines 33-35 in the usual manner, and which are heated in the thermoforming machines 33-35 until they are deformable. From the thermoforming machines 33-35 the webs 30-32, respectively, proceed to cut-out machines 36-38, respectively, conventionally called trim presses, which may be generally of the construction shown in U.S. Pat. 3,297,504 and respectively punch out the parts 10, 10", and 11 from the webs 30-32. Conveyors 39 move the parts 10' to spin welding machinery 40 of the character disclosed in U.S. Pat. 3,297,-504, while conveyors 41 are moving the parts 10" to the same spin welding machinery 40. The parts 10' and 10" are relatively telescoped in the friction welding machinery 40, and relatively rotated to securely friction weld them together.

The trim press 37 includes a punch for punching an opening O in the closed end wall of each of the parts 10' formed in web 31 which, of course, leaves the lips 24. Lips 24 do not in any material way obstruct the interiors of the bottles formed, and the openings O need not be punched with any precision to conform with the internal diameters of the portions 23 of parts 10".

The parts 11, which are punched out of the web 32 by the trim press 38 proceed to a final friction welding machine 42, also of the character illustrated in U.S. Pat. 3,297,504, on a conveyor 43. There they are united with the joined parts 10' and 10" which proceed to the friction welding machine 42 on the conveyor 44. Finally, the fully assembled and securely united bottles leave the friction welder 42 on a conveyor 45 which transfers them to filling and capping machinery which is not shown since it forms no part of the present invention.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A method of making a thin walled flexible thermoplastic vessel, particularly for carbonated beverages, comprising: differential pressure forming a plurality of container-shaped upper side wall sections having necks at their closed ends and open opposite ends in heated, deformable thermoplastic web; severing said upper side wall sections from the web at their open ends; differential pressure forming a plurality of container-shaped lower side wall sections having closed ends and open opposite ends in a second heated deformable thermoplastic web; severing said lower side wall sections from the web at their open ends; punching out the closed ends of the lower side wall sections to leave a slight inturned edge thereon; differential pressure forming a plurality of container-shaped bottom wall sections having closed, generally convex ends and open opposite ends in a third heated deformable thermoplastic web; severing said bottom wall sections from the web at their open ends; and welding the sections in assembled relation with the bottom sections telescopically received in the lower side wall sections.

2. The method of claim 1 wherein the upper ends of the lower side wall sections are of slightly greater external diameter than the internal diameter of the lower ends of the upper side wall sections and are received therein with an interference fit; said sections being relatively rotated to achieve a friction weld.

3. The method of claim 1 wherein the upper ends of the bottom sections are of slightly greater external diameter than the internal diameter of the lower ends of the lower sections and are received therein with an intereference fit; said sections being relatively rotated to achieve a friction weld.

References Cited
UNITED STATES PATENTS

| | | | |
|---|---|---|---|
| 3,316,135 | 4/1967 | Brown et al. | 156—73 X |
| 3,690,088 | 9/1972 | Anderson et al. | 156—73 X |

EDWARD G. WHITBY, Primary Examiner

U.S. Cl. X.R.

156—258, 263, 324; 220—Dig. 14; 229—4.5